United States Patent
Smith (10) Patent No.: US 11,888,817 B2
(45) Date of Patent: Jan. 30, 2024

(54) FILTERING DATA LOGS FROM DISPARATE DATA SOURCES FOR PROCESSING BY A SECURITY ENGINE

(71) Applicant: Cysiv, Inc., Dallas, TX (US)

(72) Inventor: Daniel James Smith, Ottawa (CA)

(73) Assignee: Cysiv, Inc., Dallas, TX (US)

( * ) Notice: Subject to any disclaimer, the term of this patent is extended or adjusted under 35 U.S.C. 154(b) by 110 days.

(21) Appl. No.: 17/089,514

(22) Filed: Nov. 4, 2020

(65) Prior Publication Data

US 2022/0141186 A1    May 5, 2022

(51) Int. Cl.
*H04L 9/40*    (2022.01)

(52) U.S. Cl.
CPC .......... *H04L 63/0263* (2013.01); *H04L 63/14* (2013.01); *H04L 63/20* (2013.01)

(58) Field of Classification Search
CPC ... H04L 63/02–029; H04L 63/14–1491; H04L 63/20
See application file for complete search history.

(56) References Cited

U.S. PATENT DOCUMENTS

| | | | |
|---|---|---|---|
| 2002/0019945 A1* | 2/2002 | Houston | H04L 63/1408 709/224 |
| 2008/0082473 A1* | 4/2008 | Grabarnik | G06F 16/258 706/47 |
| 2012/0246200 A1* | 9/2012 | Balasubramanian | H04L 67/146 709/228 |
| 2016/0021188 A1* | 1/2016 | Tapia | G06F 11/3006 709/201 |
| 2016/0301709 A1* | 10/2016 | Hassanzadeh | H04L 67/10 |
| 2020/0356432 A1* | 11/2020 | Pandey | G06N 5/04 |

* cited by examiner

*Primary Examiner* — Madhuri R Herzog
(74) *Attorney, Agent, or Firm* — Womble Bond Dickinson (US) LLP (57) ABSTRACT

A security system obtains data logs from a set of security applications that each output data of different data types and in different formats. A filtering module obtains the data from the security applications as an input message stream and processes the into message stream into an output message stream with messages in a standardized format for processing by a security engine. The filtering module includes a set of filters each tailored to process data from a different data source. The filtering module detects the data source from analysis of the data and applies the corresponding filter to generate the output message stream. The security engine then detects patterns in the output data stream and provides alerts to an administrative interface when it detects a pattern indicative of malicious activity.

20 Claims, 5 Drawing Sheets

FILTERING DATA LOGS FROM DISPARATE DATA SOURCES FOR PROCESSING BY A SECURITY ENGINE

FIELD OF ART

The present disclosure generally relates to network security and more specifically to data filtering for processing by a security engine.

BACKGROUND

In an enterprise environment, various on-premise security software or external software services may be employed to protect enterprise applications and data. Example applications may include firewalls, malware detection applications, authentication applications, and various network monitoring services. These applications may each collect network traffic or other data relevant to their operation. In order to detect and analyze security threats to the enterprise, it is useful to detect patterns indicative of malicious activity that may appear in the collective data set derived from these different types of applications. However, this collective analysis is challenging because different security applications obtain different types of data and may log the data in inconsistent formats.

SUMMARY

A security system generates security alerts indicative of detected security threats based on filtered security data derived from multiple disparate data sources. An input message stream is obtained from a set of data sources. The input message stream comprises a sequence of input security-related data entries in different respective native formats that varies between the different data sources. A set of filters are stored that each correspond to different data sources of the set of data sources. A set of filter selection rules are applied to a current input message of the input message stream to identify a filter from the set of filters associated with a corresponding data source from which the current input message was derived. The identified filter is applied to the current input message to transform the current input message to a current output message of an output message stream. Each output message of the output message stream comprises output security-related data entries in a standardized format independent of the data source. A set of security rules are then applied to the output message stream to detect a data pattern indicative of malicious activity. A security alert is generated to an administrative interface indicative of the detected data pattern.

In an embodiment, the current input message comprises a set of one or more key-value pairs that is natively formatted based on its corresponding data source. In contrast, the output message comprises a set of one or more key-value pairs that conforms to a standardized predefined format independent of the data source.

In a further embodiment, a non-transitory computer-readable storage medium stores instructions that when executed by a processor causes the processor to execute the above-described method. In yet another embodiment, a computer system includes a processor and a non-transitory computer-readable storage medium that stores instructions for executing the above-described method.

BRIEF DESCRIPTION OF THE DRAWINGS

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

A security system obtains data logs from a set of security applications that each output data of different data types and in different formats. A filtering module obtains the data from the security applications as an input message stream and transforms the input message stream into an output message stream with messages in a standardized format for processing by a security engine. The filtering module includes a set of filters each tailored to process data from a different data source. The filtering module detects the data source from analysis of the data and applies the corresponding filter to generate the output message stream. The security engine then detects patterns in the output data stream and provides alerts to an administrative interface when it detects a pattern indicative of malicious activity.

Figure 1:
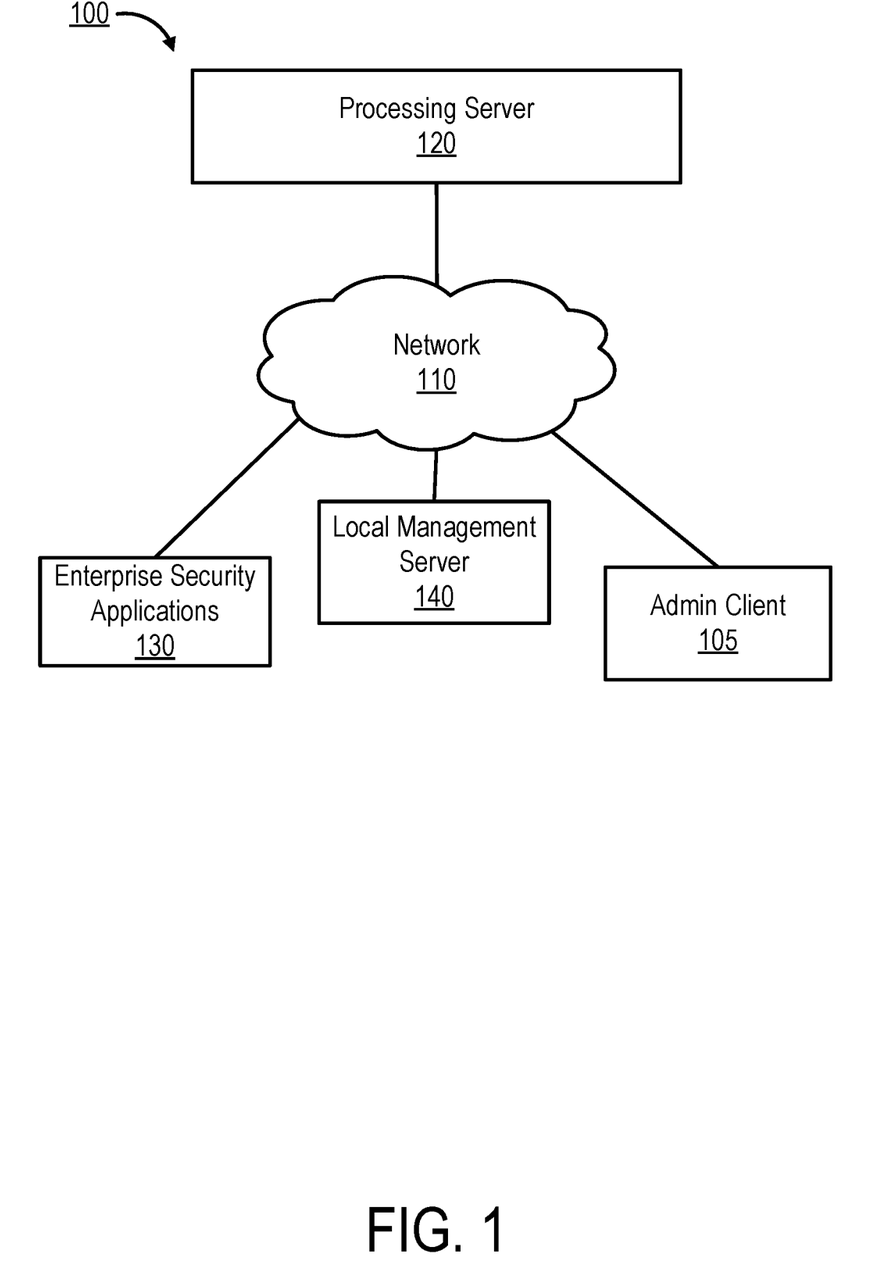
FIG. 1 is a block diagram representing a system environment for generating security alerts based on security-related data collected from a set of disparate data sources.

FIG. 1 is a high-level block diagram illustrating a system environment 100 for a security system. The system environment 100 comprises a processing server 120, a network 110, a set of enterprise security applications 130, a local management server 140, and an administrative client 105.

The enterprise security applications 130 comprise a set of applications executing within an enterprise environment for performing various security related functions. Examples of enterprise security applications 130 can include for example, firewalls, antivirus applications, web proxies, cloud monitoring services, or other applications that monitor network traffic or local data that may be relevant to detecting security threats. The enterprise security applications 130 may each generate data logs with data relevant to their respective security functions that can be accessed by the processing server 120 as described below to detect security threats.

Each of the data logs for different security applications 130 may include different types of data and may format the data in different ways.

The local management server 140 performs local acquisition and processing of the data obtained from the security applications 130. For example, the local management server 140 may capture the various data logs or portions thereof and send a stream of messages to the processing server 120 encoding the captured data. The local management server 140 may furthermore control various configuration parameters of the security applications 130 to control operation of the security applications and acquisition of the data logs.

The administrative client 105 comprises a local computing device for accessing and interacting with security-related information generated by the processing server 120. For example, the administrative client 105 may enable access to a user interface dashboard that provides security alerts relating to detected security threats, aggregated security information, or various customizable metrics. The administrative client 105 enables an administrative to monitor security threats relating to the enterprise and take remedial actions to reduce or eliminate the threats.

The processing server 120 obtains local security-related data from the local management server 140, processes the data to detect malicious or suspicious activity, and output security alerts to the administrative client 105. As described in further detail below, the processing server 120 enables processing of security-related data from a set of disparate security applications 130 that may produce different types of security data and present the respective data in different native formats. The processing server 120 intelligently filters, aggregates and processes the data to detect patterns of behavior across the multiple different security applications 130 to enable robust detection of security threats.

The network 110 represents the communication pathways between the processing server 120, the security applications 130, the local management server 140, and the administrative client 105. The network 110 can include a wide area network (WAN) such as the Internet, and may also include one more local area networks (LAN). For example, in one embodiment, the enterprise security applications 130, local management server 140 and administrative client 105 each operate within an LAN associated with the enterprise, while the processing server 120 operates as a remote cloud server. In alternative implementations, all or some of the functions attributed to the processing server 120 herein may instead be executed locally on the LAN. Additionally, in alternative implementations all or some of the functions attributed to the local management server 140 may instead be provided on a remote server accessible via a WAN. Further still, one or more the enterprise security applications 130 may execute locally within a LAN of the enterprise while one or more other security applications 130 may execute as cloud services provided over a WAN.

Each of the enterprise security applications 130, local management server 140, administrative client 105, and processing server 120 may be implemented in a computing system with one or more processors and a non-transitory computer-readable storage medium that stores instructions that when executed by the one or more processors, causes the one or more processors to carry out the functions described herein. These functions may furthermore be executed locally on a single physical processing device or in a distributed manner on one or more distributed processing devices.

Figure 2:
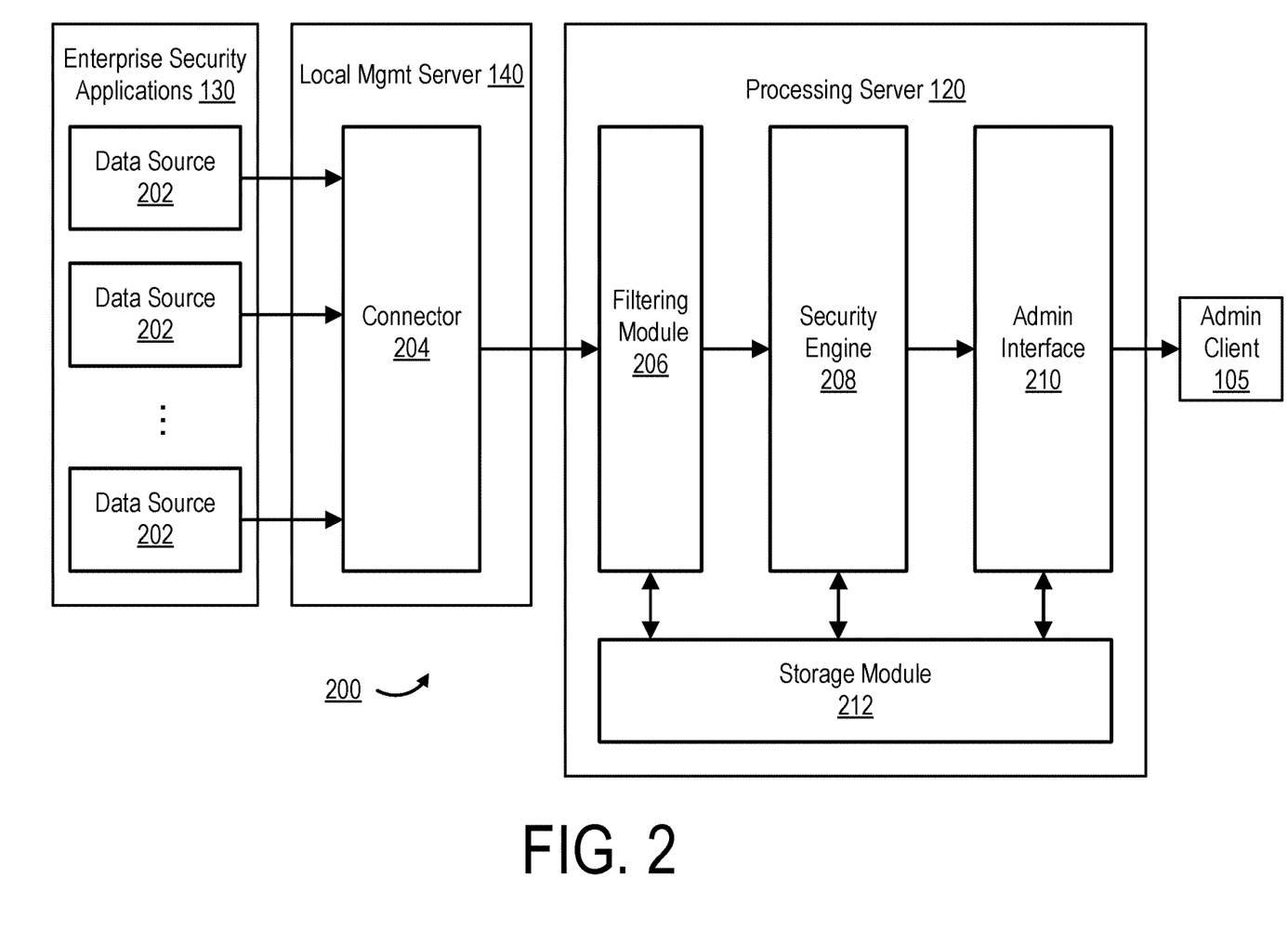
FIG. 2 is a logical block diagram of a system for processing data from a set of disparate data sources to generate security alerts.

FIG. 2 is a logical block diagram illustrating an example embodiment of a security system 200 that can be implemented in the computing environment 100 of FIG. 1. The security system 200 includes a set of data sources 202, a connector 204, a filtering module 206, a security engine 208, an administrative interface 210, and a storage module 212. Alternative embodiments may include additional or different components.

The data sources 202 provide security-related data that can be analyzed to detect malicious activity. The data sources 202 may be implemented as components of the enterprise security applications 130 described above and may include data sources associated with firewalls, antivirus applications, web proxies, cloud monitoring services, or other applications that monitor network traffic or local data. In some cases, a single security application 130 may include multiple data sources 202. The data sources 202 generally produce data logs that store the relevant data in native formats specific to the respective data sources 202. For example, some data sources 202 may generate data logs in a JSON format, other data sources may generate data logs in an XML format, and yet other data sources 202 may generate data logs in a different format. Furthermore, each data source 202 may generate different types of data. Different data sources 202 may furthermore produce related data types using different naming conventions or syntaxes that are inconsistent with each other. For example, different data sources 202 may present data such as time stamps, dates, IP addresses, or other information according to different conventions. Additionally, different data sources 202 may utilize different delimiter characters or other formatting characters together with underlying data.

The connector 204 obtains the data from the various data sources 202 and provides the data to the filtering module 206. The connector 204 may utilize different mechanisms to obtain the data depending on the varying configurations of the respective data sources 202. For example, some data sources 202 include native mechanisms to enable the connector 204 to access to the data logs via TCP connections or via webhooks. In other cases, the data sources 202 may write data logs to a memory location that the connector 204 accesses to obtain the data logs. For different data sources 202, the connector 204 may obtain the respective data logs as streaming data as it is generated, may periodically pull data from the data sources 202, may access the data in response to an alert from the data source 202, or may use a different timing mechanism for accessing the data logs. The connector 204 may furthermore break the acquired data into a stream of individual messages for providing to the filtering module 206. For example, each message may represent a single log entry or a set of nested log entries. In an embodiment, the connector 204 may be implemented locally on the local management server 140. Alternative the connector 204 may be implemented as part of the processing server 120.

Figure 3:
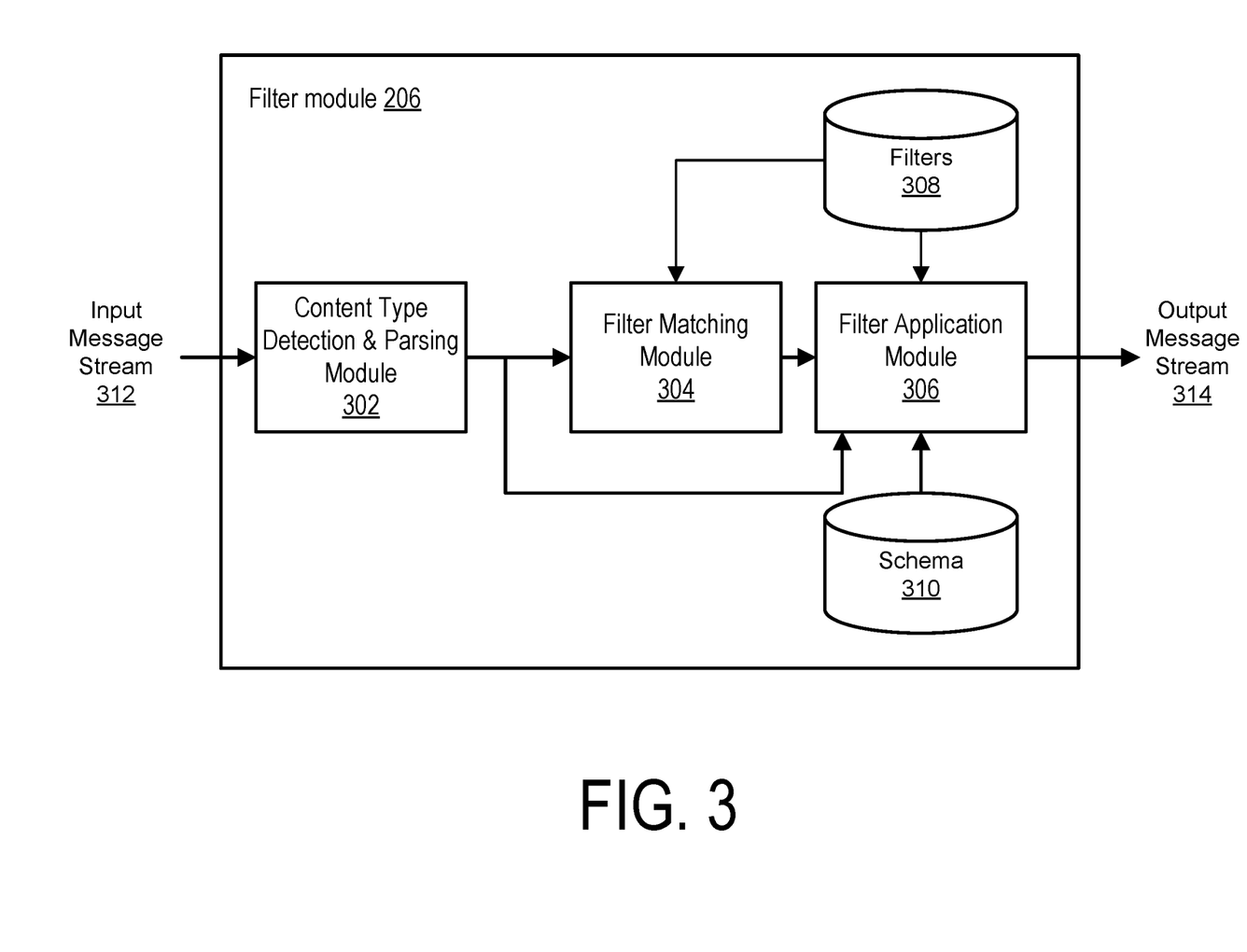
FIG. 3 is a block diagram of a filter module for filtering data for a security engine.

The filtering module 206 obtains a stream of input messages from the connector 204 and generates a stream of output messages representing the data according to a predefined schema. While the input messages are obtained from different data sources 202 that produce different types of data and represent the data in different ways, the output messages from the filtering module 206 represent the data in a standardized format. In an embodiment, the filtering module 206 transforms the input message stream into an output message stream comprising a sequence of key-value pairs. Here, each key-value pair includes a key indicative of the type of data and a value associated with the key. The keys in the output message stream are limited to a predefined set of known keys that use consistent naming conventions and represent the values in a consistent way. In an embodiment, the output message stream is in a JSON format. FIG. 3 describes an example embodiment of a filtering module 206 in further detail.

The security engine 208 obtains the output message stream from the filtering module 206 and applies a set of security rules to detect patterns in the data that are indicative of malicious activity. Some security rules may detect a single event indicative of a specific type of malicious activity. Other security rules may detect a pattern of activity that are indicative of a security threat when taken together. In a representative example scenario, an email server logs an incoming email with a document attached. An email client then logs that the document was saved. A desktop monitoring application records that a word processing application executes a command at a command prompt. A network monitoring application then observes an attempt to log into a server that the client has never connected to previously. This particular sequence is indicative of a client that became infected with malware via an email attachment disguised as a document. The security engine 208 can apply a detection rule that detects this suspicious behavior based on the sequence of events derived from different data sources. In another representative example scenario, a network monitoring application may detect multiple failed login attempts to different user accounts on different servers that all originate from the same client device. This sequence may be indicative of an attacker probing the network and can be detected by a detection rule of the security engine 208 based on the sequence of events.

In an embodiment, the security engine 208 may categorize a threat level of detected activity and take different automated actions depending on the threat level. For example, the security engine 208 may automatically initiate alert for high threat level activity. The security engine 208 may furthermore automatically generate recommendations for remediating threats, or may automatically take steps to remove a threat. For example, the security engine 208 may automatically lock a user out of an account in response to the account being used to download sensitive files. In another example, the security engine 208 may invoke a snapshotting procedure in response to a detection event to obtain a sequence of snapshots of a computer state that enables later analysis. In yet another example, the security engine 208 may automatically shut down a computer contacting a remote command-and-control server in response to particular detection events.

The administrative interface 210 generates a dashboard for displaying information relating to malicious activity detected by the security engine 208 (e.g., via the administrative client 105). The administrative interface 210 may aggregate security information in a variety of ways including, for example, generating graphs, timelines, metric displays, or other visual elements relating to security threats to the enterprise. The administrative interface 210 may furthermore enable filtering, searching, and sorting of security threats generated by the security engine 208 or may provide access to the message streams relating to the detected threats.

The storage module 212 interfaces with the filtering module 206, security engine 208, and/or the administrative interface 210 to store and retrieve security data. For example, the security module 212 may store the output message stream from the filtering module 206 and the security threat data detected by the security engine 208. This data may be accessed by the administrative interface 210 for displaying on the dashboard. In an embodiment, the storage module 212 includes both a short-term storage and a long-term storage. The short-term storage stores data generated over a relatively short time window (e.g., the last 30 days) in a form that can be rapidly accessed. The long-term storage may store older data that may need to be accessed only occasionally but may be stored in a form that is slower to retrieve.

In an embodiment, the filtering module 206, security engine 208, storage module 212, and administrative interface 210 may be implemented at least partially on the processing server 120 described above.

The described architecture enables the security engine 208 to process the output data stream according to processing rules that are agnostic to the specific data sources 202 from which the data was derived. Thus, the same security engine 208 may be applied to data from different enterprises utilizing different sets of security applications without customizing the security engine 208 to each enterprise. Furthermore, an enterprise can add or remove security applications that operate as different data sources 202 without need to update the rules of the security engine 208.

FIG. 3 is a block diagram illustrating an example embodiment of a filtering module 206. The filtering module 206 comprises a content type detection and parsing module 302, a filter matching module 304, a filter application module 306, a filter store 308, and a schema store 310. Alternative embodiments may include additional or different components.

The filter store 308 stores a set of filters that each correspond to a different data source 202. For example, the filter store 308 stores one filter for each data source 202. Each filter comprises a set of filtering rules to transform input messages derived from a corresponding data source 202 to an output message in a standardized format. Transformations applied by the filtering rules may include, for example, renaming of keys or values, changing capitalization of expressions, removing, changing, or adding delimiter or formatting characters, parsing of dates and/or time stamps, recognizing and reformatting IP addresses, or other low-level syntax-based transformations. Each filter is specifically tailored to the expected format of the input message derived from that data source 202.

The schema store 310 stores schema rules for controlling various parameters in the filters that affect the format of the output messages. The schema rules may control, for example, whether the output messages are in a JSON format, an XML format, or another format. The schema rules may furthermore control various low-level characteristics of the transformations applied by the filtering rules such as, for example, controlling a format of dates and/or timestamps.

The content type detection and parsing module 302 receives the input message stream 312, applies a set of detection rules to the input message stream to detect a format of the input messages, and parses the input messages based on the detected format. For example, the content type detection and parsing module 302 may detect if the input messages are in a JSON format, an XML format, or another predefined format based on predefined characteristics of these different formats. The detected characteristics indicative of the input message format may include, for example, presence of certain symbols in the messages, placement of certain symbols within the messages, or patterns of symbols with the messages that are indicative of the different detectable formats. The content type detection and parsing module 302 then parses the messages in accordance with the detected format. Here, parsing may include separating the message data into key-value pairs. Parsing may furthermore include basic renaming of certain recognizable key-value pairs in accordance with a standard set of renaming rules.

The filter selection module 304 selects a filter from the filter store 308 for applying to the parsed input message. Here, the filter selection module 304 may apply a set of filter selection rules to detect characteristics uniquely associated with one of a set of known data sources 202. In some cases, data sources 202 output data logs that include the name of the application or log type in the data log itself. In this case, a filter selection rule can detect the data source 202 and select the corresponding filter by directly detecting the express identifying information. In other cases, an identifier for the data source 202 is not expressly included in the data log and the filter matching module 304 may utilize a more advanced set filter selection rules to identify the data source 202. For example, filter selection rules may identify certain patterns in the data indicative of a particular data source 202. In an embodiment, the filter selection module 304 applies the filter selection rules in a predefined order until a match is found. The corresponding filter is then selected without necessarily executing the remaining filter selection rules.

The filter application module 306 applies the filter from the filter store 308 selected by the filter matching module 304 to the parsed input message in accordance with the configured schema from the schema store 310 to generate an output message 314. The filter application module 306 may switch between filters from the filter store 308 on a message-by-message basis so that an appropriate filter is applied to each message according to its respective data source 202.

Figure 4:
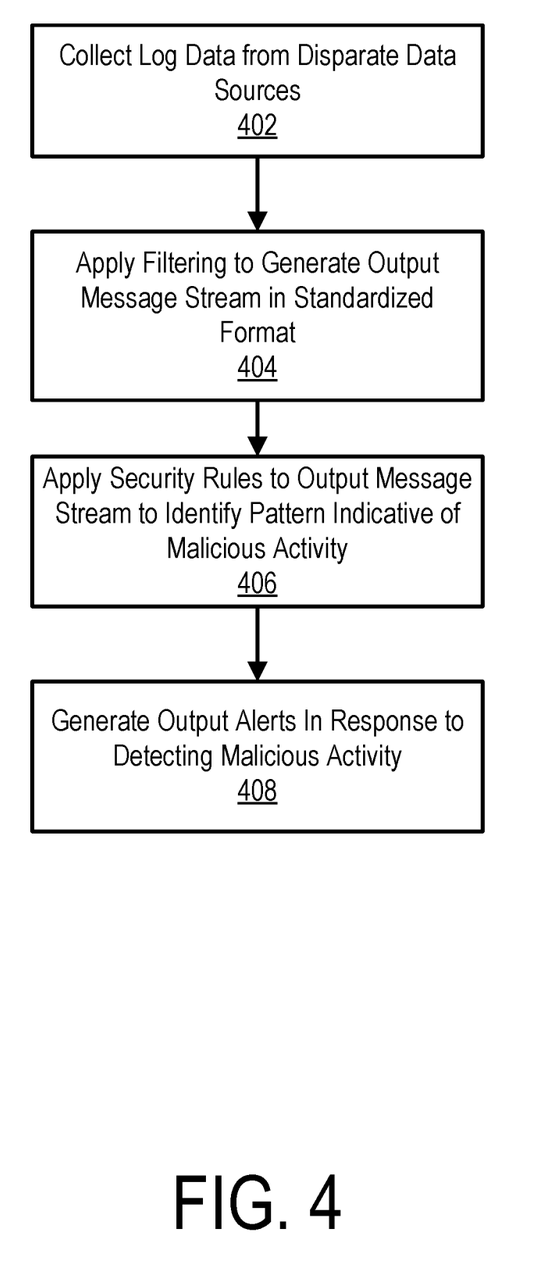
FIG. 4 is a flowchart illustrating an example embodiment of a process for generating security alerts based on security-related data collected from a set of disparate data sources.

FIG. 4 illustrates an example embodiment of a process for generating security alerts. A processing server 120 collects 402 log data from a set of disparate data source 202 that each generate different types of security-related data and may provide the data in a different format. The processing server 120 applies 404 a filter to the data to generate an output message stream representing the security data in a standardized format. The processing server 120 applies 406 a set of security rules to the output message stream to identify patterns in the security data indicative of malicious activity. The processing server 120 then generates 408 output alerts in response to detecting malicious activity (e.g., via an administrative interface 210).

Figure 5:
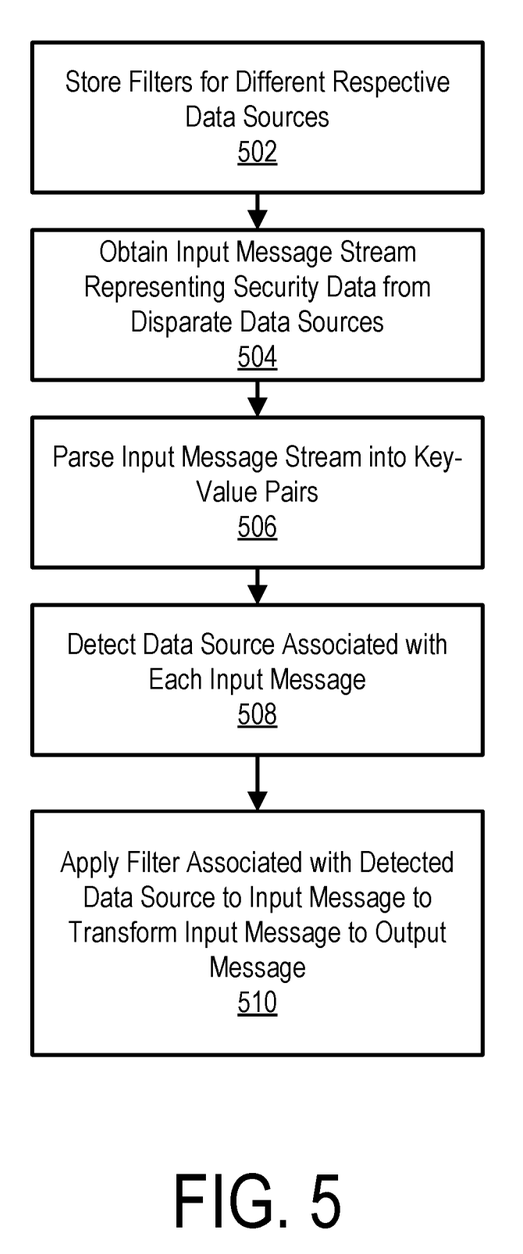
FIG. 5 is a flowchart illustrating an example embodiment of a process for filtering an input message stream to transform the input message stream into an output message stream representing security data in a standardized format for processing by a security engine.

FIG. 5 illustrates an example embodiment of a process for applying the filter to transform an input message stream 312 to an output message stream 314. A filtering module 206 stores 502 filters for each of the different respective data sources 202. The filtering module 206 obtains 504 the input message stream representing data from disparate data sources. The filtering module 206 parses the input message stream into key-value pairs. The filtering module 206 detects 508 a data source associated with each input message based on the content of the messages. The filtering module 206 then applies 510 a filter associated with the detected data source to the input messages to transform the input messages to the output messages.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method of generating security alerts comprising:
obtaining an input message stream from a set of data sources, wherein the input message stream comprises a sequence of input security-related data entries in different respective native formats that varies between different data sources of the set of data sources;
identifying a data format of a current input message of the input message stream using a set of detection rules, the current input message received from a current data source;
parsing the current input message, based on the identified data format of the current input message, to generate parsed message content, wherein the parsing comprises separating the current input message into key-value pairs;

applying a set of filter selection rules to the parsed message content to identify a filter from the set of filters for use with messages received from the current data source, wherein the filter selection rules identify a pattern associated with the current data source to identify the filter from the set of filters, and wherein each filter of the set of filters corresponds with one of the native formats of the different data sources of the set of data sources;

applying, by a processor, the identified filter to the parsed message content to transform the parsed message content to a current output message of an output message stream, wherein each output message of the output message stream comprises output security-related data entries in a standardized format independent of the data source;

applying a set of security rules to the output message stream to detect a data pattern indicative of malicious activity; and generating a security alert to an administrative interface indicative of the detected data pattern.

2. The method of claim 1, wherein applying the set of filter selection rules comprises applying the set of filter selection rules to the parsed message content in a predetermined order until a match is found, the match indicating that the identified filter is suitable for use with messages from the current data source.

3. The method of claim 1, wherein the data format of the current input messages is selected from a group including XML and JSON.

4. The method of claim 1, wherein identifying the data format of the current input message comprises:
identifying one or more symbols in the current input message; and
determining the data format of the current input message, placement of the one or more symbols within the current input message, or patterns of the one or more symbols within the current input message.

5. The method of claim 1, wherein applying the set of filter selection rules comprises:
applying a data source-specific detection rule to identify characteristics of the current input message uniquely associated with the corresponding data source from which the current input message was derived.

6. The method of claim 1, wherein the set of filters comprise a single filter for each of the set of data sources.

7. The method of claim 1, wherein generating the security alert comprises:
generating a recommended remedial action to remediate a security threat associated with the detected data pattern.

8. A non-transitory computer-readable storage medium storing instructions for generating security alerts, the instructions when executed by a processor causing the processor to:
obtain an input message stream from a set of data sources, wherein the input message stream comprises a sequence of input security-related data entries in different respective native formats that varies between different data sources of the set of data sources;
identify a data format of a current input message of the input message stream using a set of detection rules, the current input message received from a current data source;
parse the current input message, based on the identified data format of the current input message, to generate parsed message content, wherein the parsing includes separating the current input message into key-value pairs;
apply a set of filter selection rules to the parsed message content to identify a filter from the set of filters for use with messages received from the current data source, wherein the filter selection rules identify a pattern associated with the current data source to identify the filter from the set of filters, and wherein each filter of the set of filters corresponds with one of the native formats of the different data sources of the set of data sources;
apply the identified filter to the parsed message content to transform parsed message content to a current output message of an output message stream, wherein each output message of the output message stream comprises output security-related data entries in a standardized format independent of the data source;
apply a set of security rules to the output message stream to detect a data pattern indicative of malicious activity; and
generate a security alert to an administrative interface indicative of the detected data pattern.

9. The non-transitory computer-readable storage medium of claim 8, wherein to apply the set of filter selection rules the processor is to: apply the set of filter selection rules to the parsed message content in a predetermined order until a match is found, the match indicating that the identified filter is suitable for use with messages from the current data source.

10. The non-transitory computer-readable storage medium of claim 8, wherein the data format of the current input messages is selected from a group including XML and JSON.

11. The non-transitory computer-readable storage medium of claim 8, wherein to identify the data format of the current input message the processor is to:
identify one or more symbols in the current input message; and
determine the data format of the current input message based on one or more of: presence of the one or more symbols in the current input message, placement of the one or more symbols within the current input message, or patterns of the one or more symbols within the current input message.

12. The non-transitory computer-readable storage medium of claim 8, wherein to apply the set of filter selection rules the processor is to:
apply a data source-specific detection rule to identify characteristics of the current input message uniquely associated with the corresponding data source from which the current input message was derived.

13. The non-transitory computer-readable storage medium of claim 8, wherein the set of filters comprise a single filter for each of the set of data sources.

14. The non-transitory computer-readable storage medium of claim 8, wherein to generate the security alert the processor is to:
generate a recommended remedial action to remediate a security threat associated with the detected data pattern.

15. A computer system comprising:
a processor; and
a non-transitory computer-readable storage medium storing instructions to generate security alerts, the instructions when executed by the processor to cause the processor to:

obtain an input message stream from a set of data sources, wherein the input message stream comprises a sequence of input security-related data entries in different respective native formats that varies between different data sources of the set of data sources;

identify a data format of a current input message of the input message stream using a set of detection rules, the current input message received from a current data source;

parse the current input message, based on the identified data format of the current input message, to generate parsed message content, wherein the parsing includes separating the current input message into key-value pairs;

apply a set of filter selection rules to the parsed message content to identify a filter from the set of filters for use with messages received from the current data source, wherein the filter selection rules identify a pattern associated with the current data source to identify the filter from the set of filters, and wherein each filter of the set of filters corresponds with one of the native formats of the different data sources of the set of data sources;

apply, by the processor, the identified filter to the parsed message content to transform the parsed message content to a current output message of an output message stream, wherein each output message of the output message stream comprises output security-related data entries in a standardized format independent of the data source;

apply a set of security rules to the output message stream to detect a data pattern indicative of malicious activity; and generate a security alert to an administrative interface indicative of the detected data pattern.

16. The computer system of claim 15, wherein to apply the set of filter selection rules the processor is to apply the set of filter selection rules to the parsed message content in a predetermined order until a match is found, the match indicating that the identified filter is suitable for use with messages from the current data source.

17. The computer system of claim 15, wherein the data format of the current input messages is selected from a group including XML and JSON.

18. The computer system of claim 15, wherein to identify the data format of the current input message the processor is to:

identify one or more symbols in the current input message; and determine the data format of the current input message based on one or more of: presence of the one or more symbols in the current input message, placement of the one or more symbols within the current input message, or patterns of the one or more symbols within the current input message.

19. The computer system of claim 15, wherein to apply the set of filter selection rules the processor is to:

apply a data source-specific detection rule to identify characteristics of the current input message uniquely associated with the corresponding data source from which the current input message was derived.

20. The computer system of claim 15, wherein the set of filters comprise a single filter for each of the set of data sources.

* * * * *